United States Patent
Chathuruthy et al.

(10) Patent No.: US 12,105,494 B2
(45) Date of Patent: Oct. 1, 2024

(54) METHOD FOR CONFIGURING A MONITORING SYSTEM USED TO MONITOR INDUSTRIAL PROCESSES AND INDUSTRIAL ASSETS

(71) Applicant: ABB Schweiz AG, Baden (CH)

(72) Inventors: Riju V. Chathuruthy, Bangalore (IN); Vinod Vijayan, Bengaluru (IN); Harikrishnan G, Bengaluru (IN)

(73) Assignee: ABB Schweiz AG, Baden (CH)

( * ) Notice: Subject to any disclaimer, the term of this patent is extended or adjusted under 35 U.S.C. 154(b) by 381 days.

(21) Appl. No.: 17/615,326

(22) PCT Filed: May 27, 2020

(86) PCT No.: PCT/IB2020/055027
§ 371 (c)(1),
(2) Date: Nov. 30, 2021

(87) PCT Pub. No.: WO2020/240437
PCT Pub. Date: Dec. 3, 2020

(65) Prior Publication Data
US 2022/0221832 A1    Jul. 14, 2022

(30) Foreign Application Priority Data

May 31, 2019 (IN) .............................. 201941021712

(51) Int. Cl.
*G05B 19/048* (2006.01)
*G05B 19/418* (2006.01)
(Continued)

(52) U.S. Cl.
CPC ....... *G05B 19/048* (2013.01); *G05B 19/4185* (2013.01); *G05B 23/0243* (2013.01); *H04L 67/2866* (2013.01)

(58) Field of Classification Search
CPC .............. G05B 19/048; G05B 19/4185; G05B 23/0243; H04L 67/2866; G06Q 10/067; G06Q 10/06
See application file for complete search history.

(56) References Cited

U.S. PATENT DOCUMENTS 8,566,748 B2 * 10/2013 Baier ..................... G06F 9/451
715/779
10,466,686 B2 * 11/2019 Moorhouse ...... G05B 19/41865
(Continued)

FOREIGN PATENT DOCUMENTS

EP       2801935 A1    11/2014

OTHER PUBLICATIONS

European Patent Office, International Search Report in International Patent Application No. PCT/IB2020/055027, 3 pp. (Jun. 23, 2020).
(Continued)

*Primary Examiner* — Chad G Erdman
(74) *Attorney, Agent, or Firm* — Leydig, Voit & Mayer, Ltd.

(57) ABSTRACT

The invention relates to a method for configuring a monitoring system for monitoring industrial processes and industrial assets. The method comprising, the monitoring system: receiving data associated with operation of industrial plants in native data format, adapting a common predefined data model to organize the data to convert in a common structured data format for use by application functions, receiving a request for data processing, generating a graphical view of the industrial process; identifying specific industrial processes and assets relating to the request of data processing and generating the graphical view; processing of specific data according to data processing request and generating a first graphical view associated for the specific data and associated identifiers according to a preconfigured first view configuration, generating a second graphical view from the
(Continued)

first graphical view by incorporating a new view configurations onto the first view configuration based on result of data processing.

6 Claims, 7 Drawing Sheets

(51) Int. Cl.
*G05B 23/02* (2006.01)
*H04L 67/2866* (2022.01)

(56) References Cited

U.S. PATENT DOCUMENTS

| | | | | |
|---|---|---|---|---|
| 2002/0188761 | A1* | 12/2002 | Chikirivao | H04L 9/40 |
| | | | | 709/250 |
| 2017/0142229 | A1* | 5/2017 | Han | H04L 67/125 |
| 2019/0188737 | A1* | 6/2019 | Asenjo | H04L 67/1097 |
| 2021/0385304 | A1* | 12/2021 | Li | G05B 19/042 |

OTHER PUBLICATIONS

European Patent Office, Written Opinion in International Patent Application No. PCT/IB2020/055027, 6 pp. (Jun. 23, 2020).

\* cited by examiner

METHOD FOR CONFIGURING A MONITORING SYSTEM USED TO MONITOR INDUSTRIAL PROCESSES AND INDUSTRIAL ASSETS

CROSS-REFERENCE TO RELATED APPLICATIONS

This patent application is a U.S. national phase patent application of International Patent Application No. PCT/IB2020/055027, filed May 27, 2020, which claims priority from Indian Patent Application No. 201941021712, filed May 31, 2019, each of which is fully incorporated herein by reference for all purposes.

FIELD OF THE INVENTION

The present invention relates generally to the field of industrial automation system and more particularly to a method for monitoring industrial processes and industrial assets associated with industrial plants and the industrial plants being operated by an industrial automation system.

BACKGROUND OF THE INVENTION

A modern industrial plant, for example a process plant or a factory for manufacturing is operated with an industrial automation system (process control system, factory automation system) that provides automated control, production planning and several other features with its monitoring systems for optimization and planning of processes/industrial equipment. Such industrial processes and systems, for example manufacturing unit or an enterprise can be modeled as a functional hierarchy of five levels or layers 0-4. The five levels are representative of the various technology and business processes that constitutes the enterprise. The level 4 can constitute the business planning and logistics decisions supported by enterprise resource planning (ERP) and supply chain management systems. Functions that are part of level 4 include a framework for organizing, defining, and standardizing the business processes necessary to effectively plan and control an enterprise. The ERP is designed to integrate business functions and can constitute of such functions as accounting, distribution, marketing, sales, and manufacturing etc. The scope of these functions also involves policies relating to continuous improvement of both its product range and manufacturing capacity; Expansion of manufacturing facilities; policy decisions on environment and product compliance, design decisions concerning for instance modular controllable transformer to realize various power ratings Level 3 constitutes the traditional manufacturing operating management (MOM) and manufacturing execution system (MES). The software systems relating to MOM and MES provide tracking and trending information to support decisions in areas such as workflow, process control, and maintenance etc. MOM is a methodology for managing and optimizing the processes occurring at the enterprise shop floor. MOM and MES systems are designed to: manage work-in-progress, manage work orders, materials on the shop floor, report material consumption data, etc.

Levels 0, 1, and 2 constitutes decisions related to real-time production events, such as process sensing, manipulation of supervisory control, and process automation technology. Monitoring systems are provided to facilitate real time control of shop floor equipment, manage machine processing, provide logic for various functionalities, execute manufacturing sequences (like batch, continuous, mass, etc.), buffer for communication to higher level systems, and deliver basic logic to operate the facility. These levels also host servers and databases that store any detailed historical data. The storage can be based on local server or/and a cloud service.

Integration and linking of all these various enterprise levels is crucial for a unified, plant-wide view of manufacturing. The process of integration would facilitate efficient sharing of information between various units of an enterprise for effective utilization of equipment and data across the levels.

MOM typically bridges the information between the Plant floor and the Enterprise application, that is level 2 and 4 respectively. There could be an integration for an ERP solution that manages the material, cost, resource and quality part of it from the enterprise and the control system. Historical data is also associated with MOM to understand the historical trend of process behavior over a period of time and for different batches. Workflow of the process, materials and qualities are fed into the MOM system through Enterprise application. The MES system processes the workflow and executes the procedure through the Control system. Such bridging of information or integration of data can help with actionable decision making in production process. For instance, analysis of the work order and total throughput time from order to shipping can be used for decision making on whether to adopt a focused factory approach or to produce multiple product lines based on different technology platforms. There could be other source of information like SQL servers or from other application wherein the data needs to be collected to make correlation and work cohesively to effectively implement various business needs.

Generally, there are specific applications (apps)/application functions/microservices developed for MOM. These applications could include independent modules for various enterprise functions such as logistics management, quality control management, maintenance management, etc. In the manufacture of transformers, for instance, many of the power and distribution transformers are typically custom-made suited to specific customer demands Most of the time there are custom logic that is required to be implemented for each of the custom-made manufacturing. For instance, depending on whether the transformer manufacturing is to be a dry-type or oil-type or the customer requirement on specific mechanical design constraints etc. will require a custom logic for the manufacture process Implementation of such customization takes quite a long time and the independent modules may not be fully integrated leading to disconnect between the hierarchical levels. The disconnect could correspond to lack of data or analytics availability or/and visibility across the enterprise systems or further effort needed to enable sharing the data and analytics across the enterprise systems. Most of the MOM and MES implementation will be highly specific and may require further configuring and customization for better integration with pre-installed applications. This will typically require separate view implementation for the modules and also authorization modules for each implementation. The view implementation gives a graphical representation of the various software modules across the enterprise layers while identifying any dependency relation between them. The dependency relation could be, for instance, "allocated to", "contained", "uses" etc. For example, if one module is allocated to another module, the dependency relation is one of "allocated to."

With the increasing complexity of the scale and function of a manufacturing unit, the number of modules can become very large. The modules can correspond to all the hardware and software components and their subcomponents along with the communication modules involved and protocols adopted etc. The current system where the system could be separated into different network areas on different levels can consist of thin clients for process control, engineering workstation, a business/ERP-System, an information management server, a plant network, A process portal/OPC servers, operator workstations/portals, a clients server network, a base system server, Dual History Logs For parallel logging in two history servers, a programmable automation controller, a third party PLC and DCS, a motor controller. Typically, this layer follows a field network which is connected to various field devices such as sensors (for temperature, pressure, flow, etc.), actuators, positioners, and the like.

The thin clients for process control can be used as process portal. It offers a portal with features and functions designed to facilitate and optimize any process of the enterprise. Process Portal is the user interface for participating in processes. The engineering workstation could be used to develop control strategy design or configure the system. The information management server hosts information such as the production information management, he Information Management server also supports data access by third-party applications. A plant network provided facilitates data transmission to and from other parts of the plant including a process portal server. The Process Portal server can be accessed through a graphical user interface on the process control portal. It hosts process data collection, storage and analysis tools; an advanced alarm management system; a comprehensive historian; and an advanced reporting package. The server information can also be accessed by operator workstation/portals which provides an interface to perform various operational tasks and integration of workflows with access to multiple applications. The operator workstations can be connected to other servers through a client server network to enable transmission of information related to various operations between the workstation and servers. These other servers could be the base system server, dual history logs for parallel logging in two history servers. They can host information that includes control configuration for a control system (industrial automation system), build data for various applications, data for graphic configuration etc. They can receive information for storage and archive through the control network. The control network can also be used to control various process instrumentation such as the programmable automation controller, third party PLC and DCS, the motor controller etc.

Such a system view as described above does not offer the optimal system flexibility that enables efficient data integration and dynamic view creation of processes and processing assets to perform analysis and fault detection etc. Particularly, there is also a need of a system view when information is being integrated from multiple industrial plants to be able process information holistically relating to processes/equipment of such multiple plants. Various applications spanning multiple services face the challenge of integration making it difficult to customize the applications for different customers or specialist within the enterprise. Also, a drill down approach to analyze and identify a fault in the process or its processing requires more engineering effort and is difficult to corelate the information that is available from multiple sources.

Therefore, there is a need to develop a framework for monitoring system that allows to flexibly integrate various devices/equipment/assets and their process data as well as results data from a wide range of data sources such as various servers, historians, assets, etc.

SUMMARY

The above-mentioned shortcomings, disadvantages and problems are addressed herein which will be understood by reading and understanding the following specification.

The present invention provides a method for configuring a monitoring system for monitoring industrial processes and industrial assets associated with plurality of industrial plants, wherein each industrial plant is operated with one or more industrial automation system. The method comprising, the monitoring system: receiving data associated with industrial processes, operation of industrial plant, and industrial assets in an industrial plant in a one or more native data model from one or more industrial automation systems through one or more gateways according to a preconfigured protocol configuration in the one or more gateway. The monitoring system adapting a common predefined data model to organize data associated with the industrial processes, operation of industrial plant, and industrial assets received in one or more native data models from the one or more industrial automation system and to convert data in a common structured data format for use by plurality of application functions configured in the monitoring system relating to data processing and generation of graphical views associated with industrial processes and industrial assets, wherein the common predefined data model provides an identifier to associate the industrial processes and corresponding industrial assets; receiving a request for data processing and generating a graphical view of the industrial process and corresponding assets using one or more application functions from the plurality of application functions; identifying specific industrial processes and industrial assets associated relating to the request of data processing and generating the graphical view; extracting specific data and identifiers associated with industrial processes and industrial assets; processing of specific data according to data processing request and generating a first graphical view associated with the industrial process and corresponding assets for the processed specific data and associated identifiers according to a preconfigured first view configuration, wherein processing of specific data includes at least one of analysis of process data for diagnostics, predications relating to process and assets, identification of fault location, control of process and assets, information access control for users. And finally, the monitoring system, generating a second graphical view from the first graphical view by incorporating at least one new view configurations onto the preconfigured first view configuration based on result of at least one data processing performed on specific data according to data processing request.

In an embodiment, the method comprises controlling at least one process parameter associated with the industrial process and/or industrial asset according to the result of at least one data processing performed.

In an embodiment, the graphical view is generated based on a role authorization for controlling an access for users.

In an embodiment, the common predefined data model is defined for variables and relational database entities for representing and storing of data.

In an embodiment, the preconfigured protocol configuration is an Open Platform Communications Unified Architecture (OPC UA), application programming interfaces (API).

In an embodiment, the identifier to associate the industrial processes and corresponding industrial assets is an XML tag for data associated with industrial processes, operation of industrial plant, and industrial assets.

BRIEF DESCRIPTION OF DRAWINGS

The appended drawings illustrate exemplary embodiments as disclosed herein and are not to be considered limiting in scope. In the drawings.

DETAILED DESCRIPTION

The present invention provides a method for configuring a monitoring system for monitoring industrial processes and industrial assets associated with plurality of industrial plants. The industrial plants are being operated with industrial automation system. In an embodiment, the present invention can be implemented as a plugin framework (flexible and dynamic monitoring system) for Manufacturing Operation Management (MOM) that supports multiple applications/application functions/microservices and data sources to be integrated and added dynamically. This provides a way to combine the manufacturing execution system (MES) and MOM data. Combining the data from these services facilitates customized and meaningful view implementation based on the multiple data sources. Dynamic views are provided by the framework so that development is minimal on the client side. Multiple apps, including analytics applications, can be included that access various data sources registered with the framework. Microservices/Application functions/Applications (Apps) communicate among each other through a message bus thus providing the microservices that integrate through the technical and business functions of an enterprise. The present invention simplifies a method for dynamic view creation.

In the following detailed description, reference is made to the accompanying drawings that form a part hereof, and which is shown by way of illustration specific embodiments, which may be practiced. These embodiments are described in sufficient detail to enable those skilled in the art to practice the embodiments, and it is to be understood that other embodiments may be utilized. The following detailed description is, therefore, not to be taken in a limiting sense.

Figure 1:
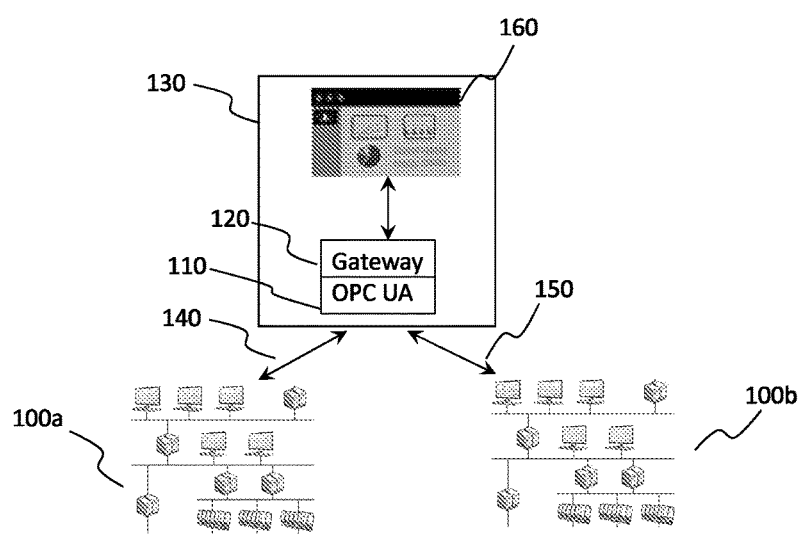
FIG. 1 shows a schematic diagram of a monitoring system for monitoring industrial processes and industrial assets associated with plurality of industrial plants.

FIG. 1 is an exemplary schematic diagram showing a monitoring system 130 for monitoring industrial processes and industrial assets associated with plurality of industrial plants. The present invention provides flexibly and dynamically integrating various data sources to update views that could be task specific. As shown in FIG. 1, an enterprise comprises multiple manufacturing or process industry control system units (industrial automation system) 100a, 100b, etc. that may even be geographically separated and over different networks. Components and functions of the enterprise equipment and processes can communicate with the monitoring system (130) through a preconfigured protocol configuration like Open Platform Communications Unified Architecture (OPC UA). Here, OPC UA being an open platform communication model is regarded as common data model for communication of data between industrial plants and monitoring system 130. However, an industrial plant can provide/receive information from the monitoring system using a data model that is native to the industrial automation system used in the industrial plant. In such scenarios the monitoring system will have a means to convert the native data model to the common data model (e.g., a common predefined data model of the OPC UA) to allow easy integration of data from multiple data sources. In an embodiment with reference to FIG. 1 the monitoring system 130, for example can receive data in native data model 140 from the industrial automation system 100a and in a common data model 150 (common structured data format) from the industrial automation system 100b. Multiple data sources can have data that can be in different native data models/formats specific to the industrial assets. The data from all the sources can be integrated and imported by the monitoring system through a gateway interface (120). The OPC UA (110), implemented on a server, provides a communication link between the plant floor and manufacturing enterprise applications (ERP, MOM, MES, etc.). The control system, configured as an OPC UA client, is provided with a dashboard that offers a layout of the view of various apps and modules. The apps and modules correspond to the multitude of different devices/equipment/assets and various data across data sources. The apps and modules can also involve analytics on the data gathered, graphical representation of such data, etc.

The complexity in the view increases with increasing number of modules that need to be represented in the view and the view could require a lot of customization. For instance, the view could span different time windows or specific process flows in the manufacturing. This requires additional views to be added while utilizing data from various sources and still work as a single system. This view creation is facilitated by providing a framework for plugin new backend and frontend components. The backend components could consist of plugin for analytics, plugins for data pre-processing such as filtering etc. The backend components are implemented on the backend servers and computational resources that could also include a cloud server. The frontend components could consist of plugin for generating partial views on the system that enables restricting the amount of information to reduce the view complexity. The frontend components are implemented on the frontend systems such as the monitoring system (130). The framework can, for instance, provide common way for Audit handling and Authorization through the plugin components.

The developed framework provides the necessary libraries and wizards to create modules, applications (or apps), and plugins. The apps can be modularized by combining multiple modules. Plugins can be added to existing modules and apps to expand various features. Plugins can also be used to encapsulate functions such as implementation of libraries, integration with various data sources etc. Additionally, the frameworks also provide with a number of plugins allowing users to readily develop complex applications and modules using these plugins. Collection of these independently deployable modules and apps constitute the microservice architecture. These microservices can function cohesively by sharing data and information among them and thus integrating different levels of the enterprise.

Figure 2:
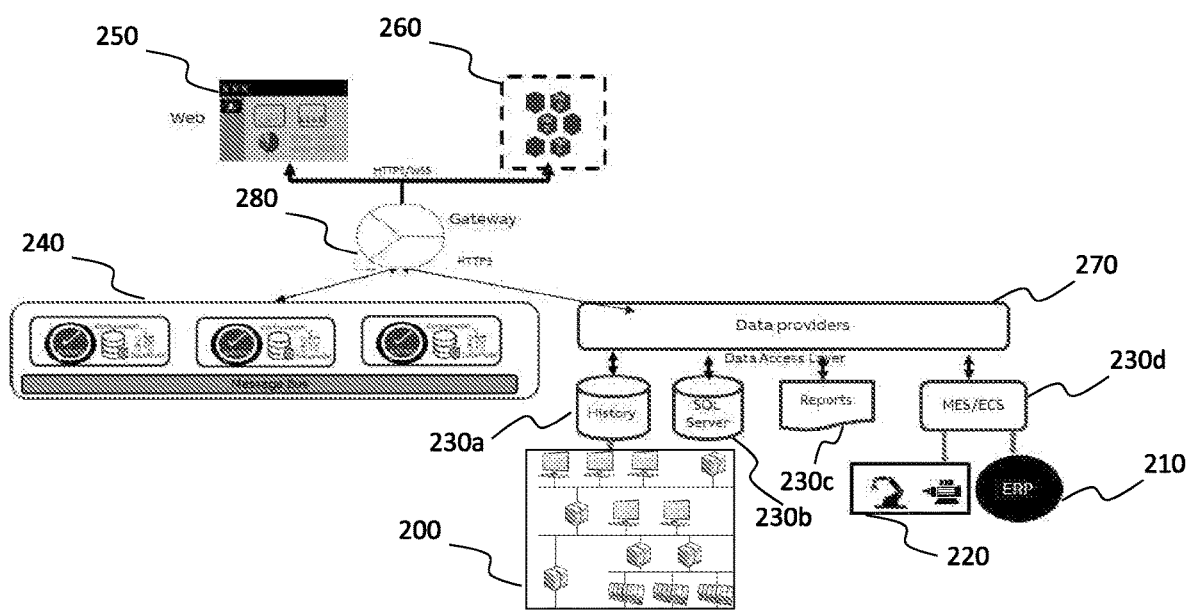
FIG. 2 shows a schematic diagram data being gathered from industrial processes, operation of industrial plant, and industrial assets in an industrial plant.

FIG. 2 shows a representation of the present invention where data is gathered from various data sources relating to industrial processes, operation of industrial plant, and industrial assets in an industrial plant. The data sources can be a historian (230*a*), a SQL server (230*b*), various enterprise related reports/documents (230*c*), the MES system and the enterprise connectivity solution (ECS) system (230*d*). The historian (230*a*) can constitute of archived data and the MES/ECS system (230*d*) could also contain information or data from the ERP (210) and other system components (220) such as motors, controllers, etc.

The data gathered from such various data sources could be in formats such as csv, tab limited, image formats, structured text or mark-up file, audio and video data etc. The data sources can be integrated through the interface of data providers (270). The data providers are software functions implemented on servers where they host the received data. The servers that host the above described data and the software functions that enable this service are together herein referred to as data providers. The data providers can also be constructed in a modular assembly along with appropriate customization and configuration. The customization and configuration allow for continuous adding of various data sources and formats. The data providers are also provided with Data Access Layer which is a collection of software functions that fetch the data from the various data sources. The data access layer fetches the data from the data sources and passes them on to the data providers which then consolidate the data, structure and organize the data in standardized formats that are also labelled or tagged to identify the data source from which the data is fetched. This consolidated data forms the common data models that can be utilized by the application functions (or microservices or apps) for various data processing such as data reduction, plot generation, statistical process analysis, etc. and subsequent graphical view generation as requested by user. The data processing and graphical view request could correspond to specific industrial processes and industrial assets where the specific industrial processes and industrial assets are identified with the labels or tags associated with them.

The modules can communicate with each other and with data providers through the universally accessible application programming interfaces (APIs). The implementation of these microservices can be either locally hosted on control system and local servers or can be distributed across cloud service and data centres. The apps and modules (240, 250, 260) access the data sources through a gateway (280) which can also host firewall and other authorization protocols. The apps can be hosted on a web (250) or be accessed through specific devices (260) such as a hand-held device. The apps could be either pre-constructed or custom-created (240) and hosted either on a web or any other device.

The framework thus allows multiple data sources to be plugin where the data sources can have their own authorization strategies implemented for instance through API gateways. The layout of the apps and modules (the microservices) can exist either on a webpage and accessed through the control system or through a collection of apps. The framework also allows for hosting custom apps developed either through the framework or independent of it. In an embodiment, the communication is supported by the Hyper Text Transfer Protocol Secure (HTTPS) or the WebSocket Secure (WSS) protocols.

Figure 3:
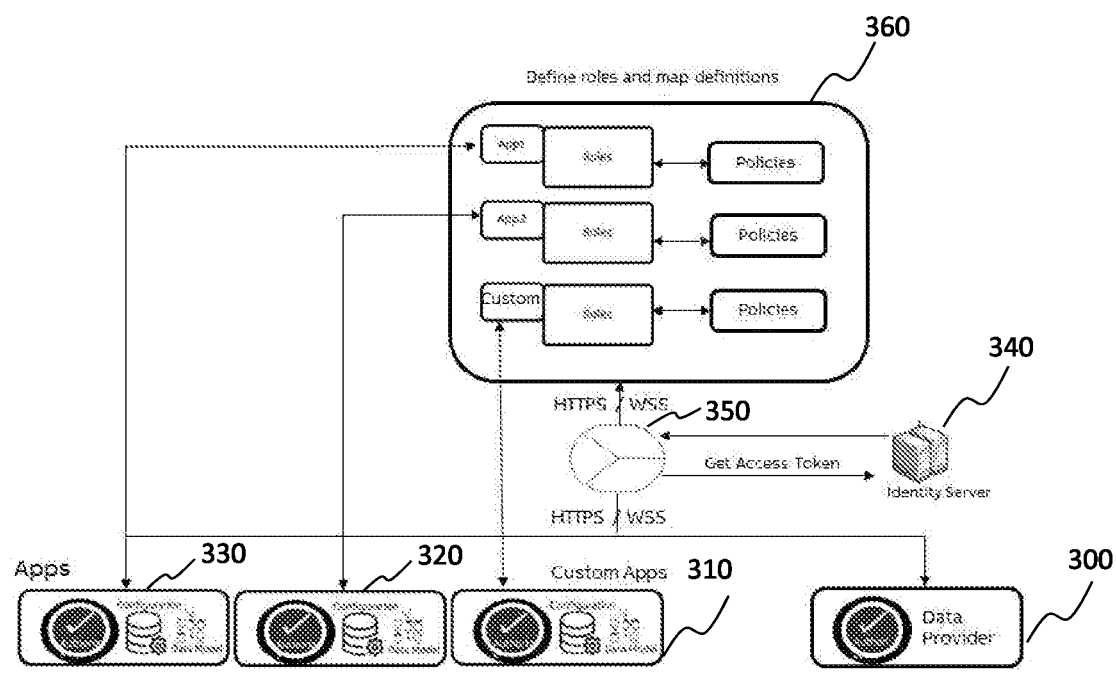
FIG. 3 shows implementation of authentication in the microservice architecture through a gateway.

FIG. 3 shows the implementation of security and authentication in the microservice architecture through a gateway 350. For example, the gateway 350 can be an API gateway. All communications from clients can be routed through this gateway to the specific apps 310, 320, and 330 and data providers 300 of the microservices. All the apps and the data providers are registered with the gateway. Registration is performed using internet protocol (IP) address and the root address which are both registered with the gateway. The registration could be implemented using a service registry database such as an identity server 340 that hosts the IP address, port number, or path to the root directory of the app. The API gateway can use this service registry to locate the microservices and route any client requests for the same.

In an embodiment of the present invention, the client calls are routed by the gateway to corresponding API of the endpoint services or data providers. The routing is based on the query request from the client in which the API gateway identifies the endpoints using the services registry database. Initially when a client is connected, user authentication is done against identity server locally or to cloud based server like Azure active directory. The authentication and authorization can be initiated by the API Gateway by gathering client credentials. The client credentials, which can be a client certificate with structured data, can also be shared with an authorization server hosted either on the cloud or on-site. Data in the client certificate could constitute of information such as client name, digital signature, etc.

Either the gateway or the authentication server then generates a token with user name corresponding to the client after the authentication is successful. The token thus provided to the client is stored by the client and used with every request made for any microservices request. The token is passed with the API calls to the corresponding controller.

Each of the API is equipped with the roles and access permission or it could be mapped to a common role. The role could be, for instance, administrator, super administrator, manager, operator, service engineer, customer, supplier, guest user, etc. Roles can be dynamically set and changed as might be necessary. More roles can be added and custom designed to suit the enterprise functioning. Each role has associated with it host of access permissions such as read and write access to data and reports, permission to schedule maintenance, Role mapping is done through a common view that provides a graphical layout where the roles are mapped to several APIs that represent the data sources. The data sources can also be logically grouped together in various ways to have multiple data sources accessible through a single API. Role mapping connects to several APIs and list the available roles. Access policies are defined for each role. Roles might have different scopes and responsibilities for each of the API. The data exposed by each of the API is based on the policy that is defined in each of the API. For instance, for the role of a customer, the access policy can be defined to restrict access to data sources corresponding to catalogue to products and services; the role of supervisor can be granted access to product flow, machine and operator efficiency; equipment operator will have access to equipment data on their line, history of past performance and ideal performance data etc.

Figure 4:
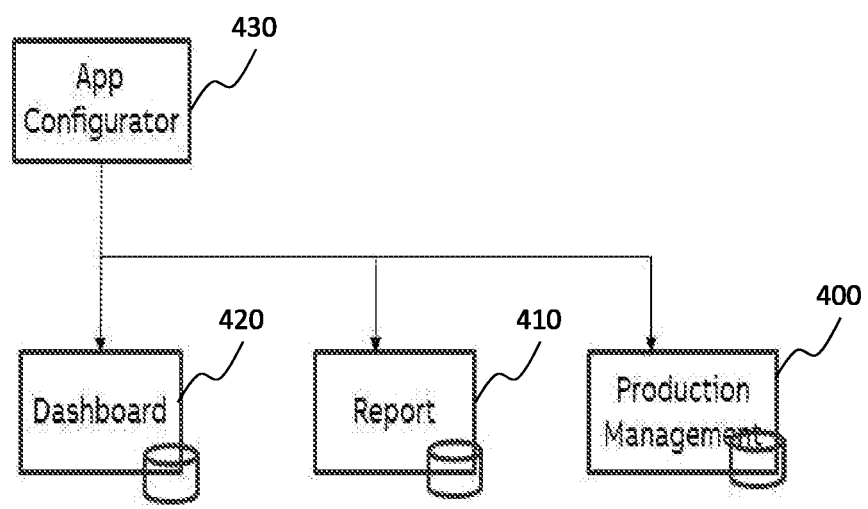
FIG. 4 shows a block diagram representation of an app configurator.

FIG. 4 shows a block diagram representation of an app configurator 430 that is used to configure all the apps on a dashboard 420, enterprise reports 410, production management applications 400 etc. with the gateway for authentication and access policies for various roles. The app configurator configures the app to facilitate each of them to have its own profile and configuration required to run by itself. All the information is contained within the service. App registration provides the routes to the gateway. This defines the routes of incoming queries and deicides on the service to be handled.

Figure 5:
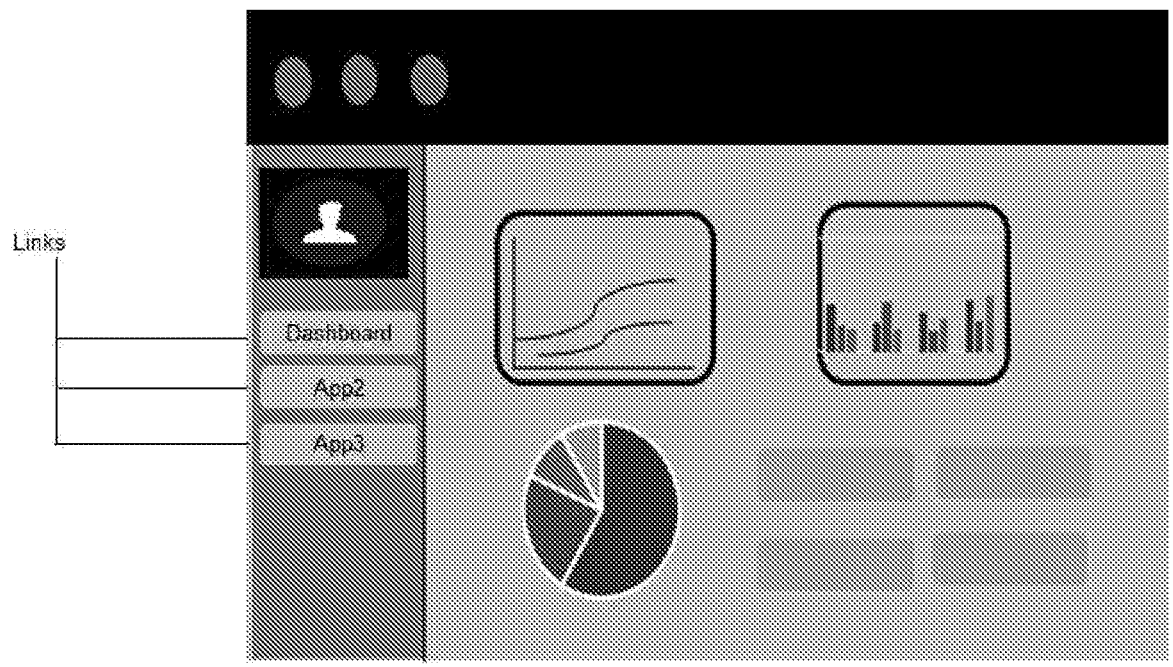
FIG. 5 shows a graphical view that implements role mapping built on a plugin architecture.

FIG. 5 shows a graphical view that implements the role mapping built on a plugin architecture that enables the addition of new widget or component in the view. The apps and widgets available are pre-configured with respect to specific roles of a user or operator. Only those apps can be configured on the dashboard for which the operator has prior role-based authentication. All the apps are linked with the dashboard and they can also be configured in the same view. Multiple apps can be hosted in same view and configured to get either a wholistic view or a sectional view of specific industrial processes and industrial assets. Customization, such as amount of details to view, can be done for each app and each of the apps can be configured for visualization in the same framework. This provides a way to extend the functionality and integrate specific views according to customer requirement. For instance, if the customer has one graphical view configured for visualization (referred to as the preconfigured first view configuration) of specific process and the corresponding industrial assets, such as a motor, where the graphical view is for specific data associated with the motor. The specific data and its analysis could include at least one of process data for diagnostics, predications relating to process and assets, identification of fault location, control of process and assets, information access control for users. The user could want to add another view (new view configuration) that might correspond to calibration of the motor, where the first graphical view did not previously have the calibration information, the new view configuration associated with the calibration can be imported onto the existing first graphical view and flexibly arranged as facilitated by the plugin framework. With the new view configuration (with calibration data) imported onto the preconfigured first view configuration, a second graphical view is generated from the first graphical view.

Applications can be plugged in to the same framework. New application can be added dynamically, and routes can be configured in the visualization.

The app widgets could be associated with roles or with specific apps or/and with data sources. For all the widgets or components endpoint references needs to be defined. The endpoints uniquely identify a data source or an app to which a service request is sent. View is quite generic, and the widgets can be placed anywhere in a dashboard or view. Direct endpoints can also be used to get data.

The data from the various data sources can be organized by the data providers in a standardized, modular, and extensible collection of data formats. This allows various apps and widgets to access the data for use and analysis. Multiple sections of plant can be integrated with different views on the dashboard hosted. Hence, while monitoring of views on the control system, the production management applications can be integrated to have a more wholistic view. This provides enterprise service partners and system integrators to create separate views and extend app functionality by adding services. It could be connectivity to a ERP system or to a specific control system.

Figure 6:
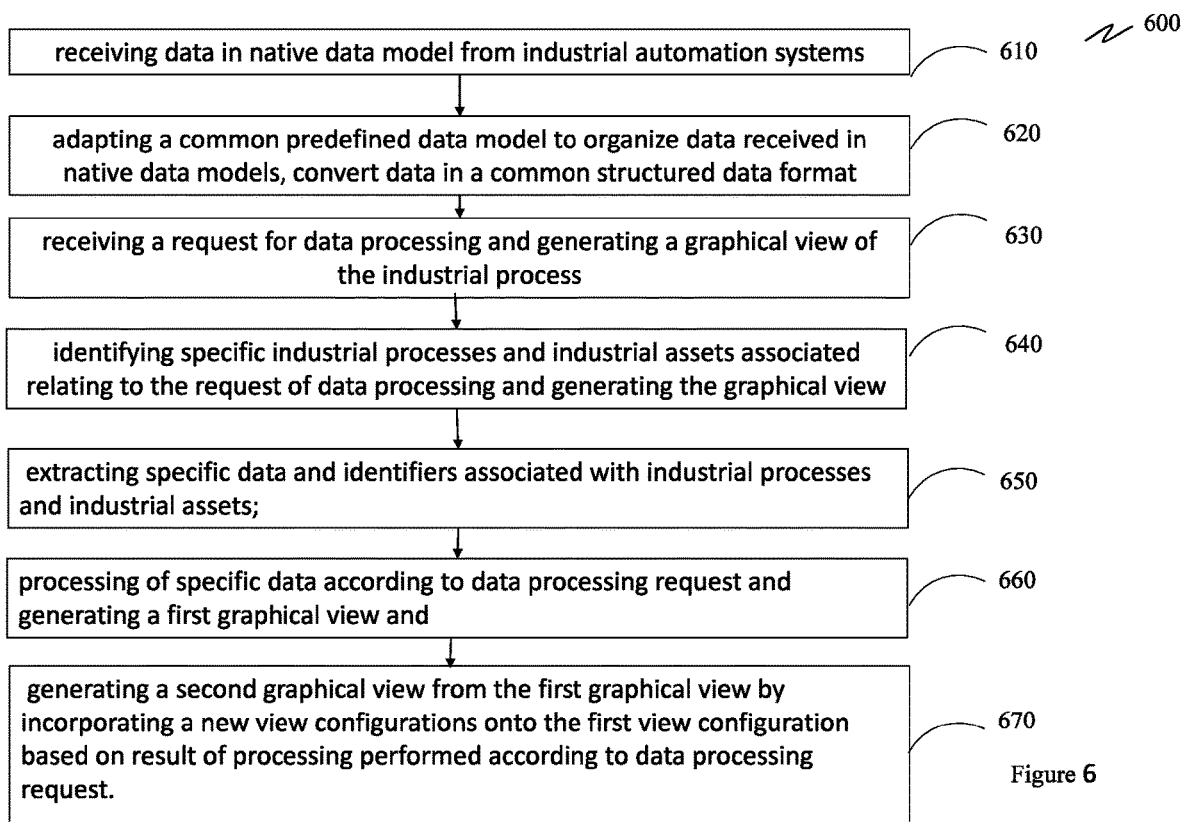
FIG. 6 shows a flow diagram of the method for configuring the monitoring system.

FIG. 6 shows a flow diagram of the method 600 for configuring the monitoring system 130 for monitoring industrial processes and industrial assets associated with the industrial plants. The industrial plant is operated with industrial automation system. As shown in step 610 the monitoring system receives data associated with industrial processes, operation of industrial plant, and industrial assets in an industrial plant. The data is received in a native data model or format from the industrial automation systems through a gateway with a preconfigured protocol configuration. The preconfigured protocol configuration can be an OPC UA as mentioned above.

As shown step 620, the monitoring system adapts a common predefined data model to organize data associated with the industrial processes, operation of industrial plant, and industrial assets and converts this data in a common structured data format for use by the application functions. The application functions or apps are configured in the monitoring system and are relating to data processing and generation of graphical views associated with industrial processes and industrial assets. The common predefined data model is defined for variables and relational database entities for representing and storing of data. Any data provider that conforms with the common predefined data model provides the data to be visualized in standard widgets that are available for views. Thus, defined common data model is a common data structure that facilitates data management and application development by unifying all data sources in the data provider.

Such data unification and structuring enables using or passing the data across multiple microservices through all hierarchical levels of the enterprise. The common predefined data model provides an identifier to associate the industrial processes and corresponding industrial assets. For example, the data can be tagged (for instance, using XML tag) to streamline the data flow across microservices while reducing error enabling easier search and retrieval of data. Adding of the tags further facilitates categorization of collection of data without a need for further modification. The data can be maintained in frontend and hence the same data can be represented in multiple widget like pie chart or bar chart.

As shown in step 630, a request is received for data processing and generating a graphical view of the industrial process and corresponding assets using one or more application functions from the plurality of application functions. At step 640 specific industrial processes and industrial assets associated relating to the request of data processing are identified for generating the graphical view. As shown in step 650 specific data and identifiers associated with industrial processes and industrial assets are extracted.

At step 660, the specific data is processed according to data processing request and a first graphical view is generated that is associated with the industrial process and corresponding assets for the processed specific data and associated identifiers according to a preconfigured first view configuration.

The processing of specific data includes analysis of process data for diagnostics, predications relating to process and assets, identification of fault location, control of process and assets, information access control for users.

Finally, at step 670 a second graphical view is generated from the first graphical view by incorporating new view configurations onto the first view configuration based on result of data processing performed on specific data according to data processing request.

In an embodiment, a link is created to directly connect to a particular database or data source. Links are associated with the tags, for instance, "DS":"/Hist/Tags/{Variablename}" data source for history is defined with its corresponding link. So MES and control system data can be associated with the historical database using t corresponding link in variable. The variable will have the link to historical data. This enables the user to represent the data values in trend or get the value for other application such as analytics.

Such analytics from integration of data sources across the different levels of an enterprise allows creating of dynamics views of the enterprise functions. The dynamic views are provided by the framework. The framework facilitates adding multiple applications and provide application specific authorization for various services and data access. The framework also permits hosing multiple web-based factory Automation application in same framework. Communication of the apps between each other provides the microservices that integrate through the technical and business functions of an enterprise. Analysis from such views allows everyone authorized within the enterprise to view all the data and analytics customized to their specific needs to make actionable decisions. For instance, a view that permits customized analysis of parameters such as a process involving reduction in poor quality rejects of transformers, reduction in its total throughput time from order to shipping, and a reduction in production total time can recommend an action favoring focused factory approach in transformer manufacture rather than producing multiple product lines based on different technology platforms.

Figure 7:
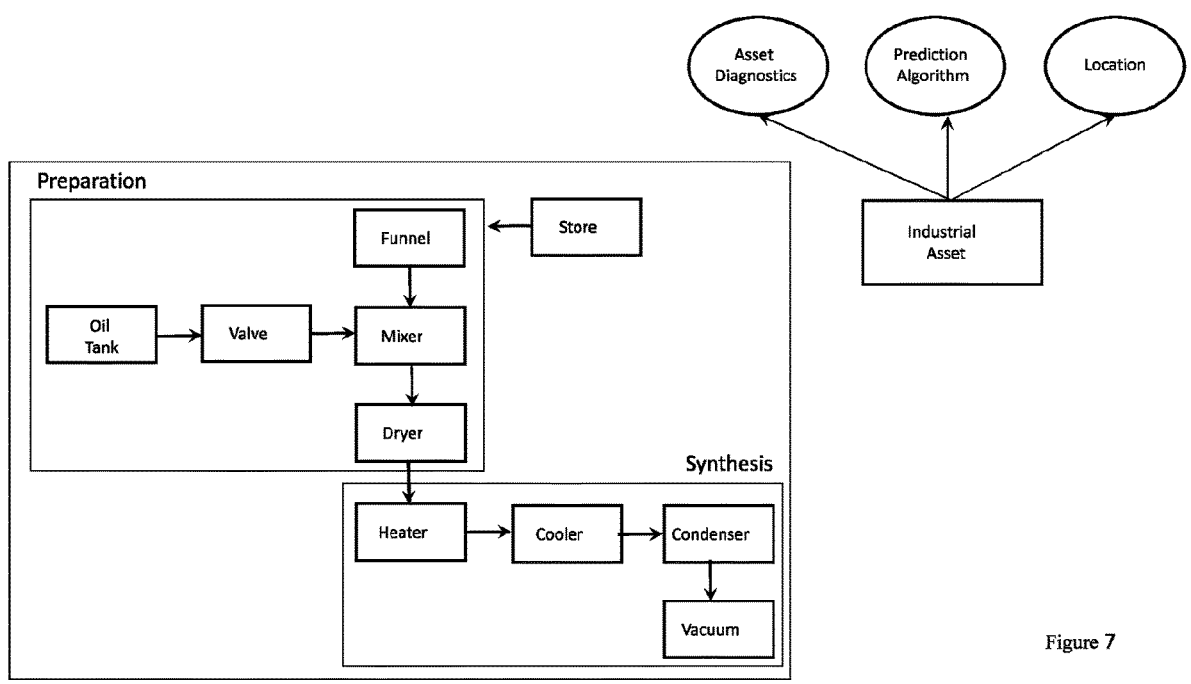
FIG. 7 shows a graphical view of a manufacturing system as an exemplary embodiment of the present invention.

FIG. 7 shows a graphical view of a manufacturing system as an exemplary embodiment of the present invention. In this example, request for data processing for fault diagnosis is performed and subsequent fault handling on an industrial system to isolate any malfunction of a manufacturing system or/and a sensing system associated with the manufacturing system. The manufacturing system could have a collection of equipment and sub-equipment such as motors, valves, heaters, dryers, oil tanks, etc. All the components and subcomponents are assets and could be sourced from multiple vendors and be supported over different communication protocols. Each of them could further be operating with different data and file formats such as plain text, audio, images, JavaScript Object Notation (JSON), etc.

Data models can be used to define the assets or objects. Definition of object model with the input and output signals provides for generation of visual objects without having to manually engineering. Various pre-built microservices could also be deployed for such visual representations. Since the microservices could be implemented in different programming languages, they are built with application programming interfaces (APIs) layers that enable using their services using standard protocols (such as HTTP). The framework provided with the invention is provided with a wide range of microservices to facilitate creating asset models with all its input/output functions and its networking environment, data integration from various data sources using the data providers, data pre-treatment and validating to meet any specific rules, data storage, etc.

The definition of object model thus makes it control system and application agnostic. The application agnostic feature come about through the flexibility the framework affords in choosing the nature of the signals and the communication modules for each device and customize it to any given application. For instance, a motor could be used in a pump or a compressor and the object model of the motor can be flexibly represented by choosing appropriate configuration or template from the microservices. The object models once created can be re-used across the manufacturing plant and even across multiple manufacturing plants using similar objects or assets.

Different parts of the plant and associated objects can be identified along with the relation and cross reference information from different aspects of a process. It was not practically possible earlier to dynamically provide a visualization for all aspects of a process that involves multiple objects and thus could have diverse aspects to any faults or failures. If each device data model is not integrated, they would have to be analyzed as independent entities and the visualization will not contain the flexible and dynamic aspects of data flow between the devices. The microservice architecture within the framework provides the flexibility by enabling the placing of different visual components (object models) at any desired location of the screen depending on the user needs. The users could be for instance, an operator or a technician, and automation engineer or data analytics engineer etc. Each of them might require different views to analyse a process and its processing. Views need to be configured with required visual objects and save the corresponding views to be dynamically recalled on-demand Users can navigate to different preconfigured and previously archived views. Furthermore, the views are flexible to have any kind of visual object that can even be added later to the system. Dynamic views are generated based on the information needed by specific roles where the views can be customized to focus on the parts of the system that are relevant for decision making in specific roles.

Views that do not previously exist can be created on-the-fly. Process view can display the whole process view or a selected part of the view. It can also generate the view based on location (Area wise) or asset (similar kind of assets or assets required for a specific process), views based on the failure condition etc. Each user could create any required dynamic views and archive them to be recalled on-demand.

Any analysis or visualization would require certain set of data associated with the recipe or process and all the equipment associated with it. This data is typically distributed across the process and variety of equipment and has to be manually built and configured to get all the necessary information and visualization. That is, there are multiple data sources possibly from different vendors with variety of data formats. Integrating all such data formats from such diverse data sources or equipment to generate a flexible and dynamic visualization is a huge engineering challenge.

Example of objects in the plant are oil tanks, motors, valves, heaters, dryers etc. Each of the object is configured to be part of a workflow. On the control system, using the microservice architecture, each object is defined through data models along with its association and input/output signals. The data models are used to display the objects or assets as visual elements interlinked to display the complete workflow. Various views can be generated, for instance, field engineers need one asset view, software engineers need another view (applications/modules; software and firmware version; authorization and access information), data analyst might need another view of data source; data structure, etc.

The framework provided enables building and utilizing various microservices associated with processing, analytics, and monitoring to enable fault diagnostics, fault isolation, and either performing corrective actions or recommending them. Such a framework, with the flexibility and dynamic aspects of the views offered, eliminates the need to create separate visualization for the process. The models are also defined with the reference parameters that represent the normal operation of the process and the state of the processing equipment. The references of the objects are defined in the model and hence any of the changes or deviations from normal behavior could be classified as a fault. A microservice application to predict the analytics can be attached to the framework to monitor the fault conditions and equipment efficiency.

In an example, a microservice function that performs analytics to monitor the equipment efficiency can be attached to the framework. A model attached to that can be used to predict the improvement on change in set point or workflow Set point can be adjusted or the workflow can be modified based on the prediction algorithm. The corrected behavior is then deployed in place and since visualization is dynamic those are updated based on the changes. This will help a dynamic view from the point of location, functional or asset point of view along with raw material and efficiency information.

This written description uses examples to describe the subject matter herein, including the best mode, and to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method for configuring a monitoring system for monitoring a plurality of industrial processes and a plurality of industrial assets associated with a plurality of industrial plants, wherein each industrial plant is operated with one or more industrial automation systems, the method comprising:
   a) receiving data associated with the plurality of industrial processes, operation of an industrial plant of the plurality of industrial plants, and the plurality of industrial assets in the industrial plant in one or more native data models from the one or more industrial automation systems through one or more gateways according to a preconfigured protocol configuration in the one or more gateways;
   b) adapting a common predefined data model to organize the data associated with the plurality of industrial processes, operation of the industrial plant, and the plurality of industrial assets received in the one or more native data models from the one or more industrial automation systems and to convert the data to a common structured data format for use by a plurality of application functions configured in the monitoring system relating to data processing and generation of graphical views associated with the plurality of industrial processes and the plurality of industrial assets, wherein the common predefined data model provides an identifier to associate industrial processes from the plurality of industrial processes with corresponding industrial assets from the plurality of industrial assets;
   c) receiving a request for data processing and generating a graphical view of one or more industrial processes from the plurality of industrial processes and one or more corresponding industrial assets from the plurality of industrial assets using one or more application functions from the plurality of application functions;
   d) identifying specific industrial processes from the one or more industrial processes and specific industrial assets from the one or more industrial assets relating to the request for data processing and generating the graphical view, wherein the specific industrial assets correspond to the specific industrial processes;
   e) extracting specific data and identifiers associated with the specific industrial processes and the specific industrial assets;
   f) processing of the specific data according to the request for data processing and generating a first graphical view associated with the specific industrial process and the corresponding industrial assets for the processed specific data and the associated identifiers according to a preconfigured first view configuration;
   g) generating a second graphical view from the first graphical view by incorporating at least one new view configuration onto the preconfigured first view configuration based on a result of processing the specific data, wherein processing of the specific data comprises one or more of analysis of process data for diagnostics, predications relating to process and assets, identification of fault location, control of process and assets, and information access control for users.

2. The method as claimed in claim 1, further comprising controlling at least one process parameter associated with the plurality of industrial processes and/or the plurality of industrial assets according to the result of processing the specific data.

3. The method as claimed in claim 1, wherein the graphical view is generated based on a role authorization for controlling an access for the users.

4. The method as claimed in claim 1, wherein the common predefined data model is defined for variables and relational database entities for representing and storing of data.

5. The method as claimed in claim 1, wherein the preconfigured protocol configuration is an Open Platform Communications Unified Architecture (OPC UA), application programming interfaces (API).

6. The method as claimed in claim 1, wherein the identifier to associate the industrial processes with the corresponding industrial assets is an extensible markup language (XML) tag for the data associated with the plurality of industrial processes, operation of the industrial plant, and the plurality of industrial assets.

\* \* \* \* \*